United States Patent
Lee et al.

(10) Patent No.: US 10,100,196 B2
(45) Date of Patent: Oct. 16, 2018

(54) POLYCARBONATE RESIN COMPOSITION AND MOLDED ARTICLE MANUFACTURED THEREFROM

(71) Applicant: LG CHEM, LTD., Seoul (KR)

(72) Inventors: Su Kyoung Lee, Daejeon (KR); Min Ji Kim, Daejeon (KR); Jong Hyun Lee, Daejeon (KR); Ryul Lee, Daejeon (KR); Sung Tae Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/403,826

(22) Filed: Jan. 11, 2017

(65) Prior Publication Data

US 2017/0204265 A1 Jul. 20, 2017

(30) Foreign Application Priority Data

Jan. 14, 2016 (KR) .................. 10-2016-0004600
Dec. 13, 2016 (KR) .................. 10-2016-0169126

(51) Int. Cl.

| | | |
|---|---|---|
| *C08L 83/00* | (2006.01) | |
| *C08L 83/10* | (2006.01) | |
| *C08L 69/00* | (2006.01) | |
| *H04B 1/3888* | (2015.01) | |
| *C08K 5/5435* | (2006.01) | |
| *C08K 7/14* | (2006.01) | |
| *C08L 51/08* | (2006.01) | |

(52) U.S. Cl.
CPC ............ *C08L 83/10* (2013.01); *C08K 5/5435* (2013.01); *C08K 7/14* (2013.01); *C08L 51/085* (2013.01); *C08L 69/00* (2013.01); *H04B 1/3888* (2013.01); *C08L 2205/03* (2013.01); *C08L 2207/53* (2013.01)

(58) Field of Classification Search
CPC .................. C08L 83/10; C08L 69/00
See application file for complete search history.

(56) References Cited

U.S. PATENT DOCUMENTS

| | | | | |
|---|---|---|---|---|
| 5,451,632 A | * | 9/1995 | Okumura ............. | C08G 64/186 |
| | | | | 524/418 |
| 9,062,164 B2 | * | 6/2015 | Kim ..................... | C08G 77/48 |
| 9,493,649 B2 | * | 11/2016 | Lee ...................... | C08L 23/08 |
| 2014/0194561 A1 | * | 7/2014 | Ganguly .............. | C08L 83/10 |
| | | | | 524/262 |
| 2018/0002488 A1 | * | 1/2018 | Park .................... | C08G 77/18 |

FOREIGN PATENT DOCUMENTS

| | | |
|---|---|---|
| CN | 103958573 A | 7/2014 |
| CN | 104736636 A | 6/2015 |
| CN | 105026494 A | 11/2015 |
| KR | 2009-0052447 A | 5/2009 |

* cited by examiner

*Primary Examiner* — Hannah J Pak
(74) *Attorney, Agent, or Firm* — Dentons US LLP

(57) ABSTRACT

Disclosed are a polycarbonate resin composition including 15 to 93% by weight of a polycarbonate-polyorganosiloxane copolymer; 0 to 70% by weight of a bisphenol-derived polycarbonate resin; 5 to 30% by weight of glass fiber surface-treated with epoxysilane; d) 1 to 5% by weight of a core-shell impact modifier; and e) 0.05 to 3% by weight of an epoxysilane additive and a polycarbonate resin composition, and a molded article manufactured therefrom.

In accordance with the present disclosure, a polycarbonate resin composition and a molded article manufactured therefrom, and more particularly to a polycarbonate resin composition suitable for satisfying demand for larger area and slimmer electronic products, etc. while providing superior rigidity, chemical resistance, and impact resistance and aesthetic appearance, and a molded article manufactured therefrom are provided.

13 Claims, No Drawings

POLYCARBONATE RESIN COMPOSITION AND MOLDED ARTICLE MANUFACTURED THEREFROM

CROSS-REFERENCE TO RELATED APPLICATIONS

This application claims priority from Korean Patent Application No. 10-2016-0004600 filed on Jan. 14, 2016 and Korean Patent Application No. 10-2016-0169126 filed on Dec. 13, 2016, the disclosure of which is incorporated by reference in its entirety as if fully set forth herein.

TECHNICAL FIELD

The present disclosure relates to a polycarbonate resin composition and a molded article manufactured therefrom, and more particularly to a polycarbonate resin composition suitable for satisfying demand for larger area and slimmer electronic products, etc. while providing superior rigidity, chemical resistance, and impact resistance and aesthetic appearance, and a molded article manufactured therefrom.

BACKGROUND ART

A polycarbonate resin, which is a thermoplastic resin prepared by reacting bisphenol A with phosgene, etc., is amorphous, thereby being transparent and having excellent heat resistance and electrical insulation. In addition, such a polycarbonate resin is known to have the highest impact strength among thermoplastic resins. Further, a polycarbonate resin exhibits minimal dimensional change due to moisture absorption and stable physical properties under a wide temperature range, thereby being an engineering plastic which is highly resistant to environmental changes.

Although such a polycarbonate resin is widely used in housings of electronic products and the like, it has week chemical resistance to cosmetics, gasoline, and the like. In addition, a polycarbonate resin has a disadvantage in that rigidity, such as internal deformation characteristics, thereof is insufficient for application to slim, large-area products.

A method of adding glass fiber, as a reinforcing agent, to a polycarbonate resin has been devised so as to increase rigidity such as internal deformation characteristics. Due to addition of glass fiber, the rigidity of a polycarbonate resin is significantly improved, but flowability thereof is decreased and superior impact strength and the like thereof are deteriorated. Particularly, glass fiber is protruded from a surface of a product, upon molding of the product, thereby leading to difficulties in obtaining a clean appearance.

Therefore, there is an urgent need for development of a polycarbonate resin having excellent chemical resistance, impact strength, and appearance characteristics while having a small deformation degree and a stable dimension to be applied to slim, large-area products.

RELATED ART DOCUMENT

Patent Document

KR 2009-0052447 B1 (published on May 26, 2009)

DISCLOSURE

Technical Problem

Therefore, the present invention has been made in view of the above problems, and it is one object of the present invention to provide a polycarbonate resin composition and a molded article manufactured therefrom, and more particularly to a polycarbonate resin composition suitable for satisfying demand for larger area and slimmer electronic products, etc. while providing superior rigidity, chemical resistance, and impact resistance and aesthetic appearance, and a molded article manufactured therefrom.

The above and other objects can be accomplished by the present disclosure described below.

Technical Solution

In accordance with one aspect of the present invention, provided are a polycarbonate resin composition including 15 to 93% by weight of a polycarbonate-polyorganosiloxane copolymer; 0 to 70% by weight of a bisphenol-derived polycarbonate resin; 5 to 30% by weight of glass fiber surface-treated with epoxysilane; d) 1 to 5% by weight of a core-shell impact modifier; and e) 0.05 to 3% by weight of an epoxysilane additive and a polycarbonate resin composition, and a molded article manufactured therefrom.

Advantageous Effects

As apparent from the fore-going, the present invention advantageously provides a polycarbonate resin composition and a molded article manufactured therefrom, and more particularly to a polycarbonate resin composition suitable for satisfying demand for larger area and slimmer electronic products, etc. while providing superior rigidity, chemical resistance, and impact resistance and aesthetic appearance, and a molded article manufactured therefrom.

BEST MODE

Hereinafter, a polycarbonate resin composition of the present disclosure and a molded article manufactured therefrom are described in detail.

The present inventors intend to increase rigidity by applying flat-type glass fiber, which has been coated with epoxysilane, to a polycarbonate resin so as to manufacture a rigid cellular material suitable for application to slim, large-area LCDs, increase impact resistance by applying a predetermined impact modifier, minimize the content of glass fiber so as to improve aesthetic appearance, and add an epoxysilane additive so as to increase chemical resistance and rigidity, and thus, confirmed that a manufactured polycarbonate resin composition has greatly improved chemical resistance, without deterioration of other properties, and provides improved aesthetic appearance due to reduced protrusion of glass fiber during molding of a product, and the present invention has been completed on the basis thereof.

The polycarbonate resin composition of the present disclosure includes a) 15 to 93% by weight of a polycarbonate-polyorganosiloxane copolymer; b) 0 to 70% by weight of a bisphenol-derived polycarbonate resin; c) 5 to 30% by weight of glass fiber surface-treated with epoxysilane; d) 1 to 5% by weight of a core-shell impact modifier; and e) 0.05 to 3% by weight of an epoxysilane additive. In this case, the polycarbonate resin composition is suitable for satisfying demand for larger area and slimmer electronic products, etc. while providing superior rigidity, chemical resistance, and impact resistance and superior aesthetic appearance upon molding of a product.

In an embodiment, the polycarbonate resin composition may include a) 15 to 50% by weight of the polycarbonate-polyorganosiloxane copolymer; b) 30 to 70% by weight of the bisphenol-derived polycarbonate resin; c) 5 to 30% by weight of the glass fiber surface-treated with epoxysilane; d) 1 to 5% by weight of the core-shell impact modifier; and e) 0.1 to 1% by weight of the epoxysilane additive. Within this range, the polycarbonate resin composition is suitable for satisfying demand for larger area and slimmer electronic products, etc. while providing superior rigidity, chemical resistance, and impact resistance and superior aesthetic appearance upon molding of a product.

In another embodiment, a) the polycarbonate-polyorganosiloxane copolymer may be included in an amount of 20 to 40% by weight or 25 to 35% by weight. Within this range, superior chemical resistance and impact resistance are provided.

a) The polycarbonate-polyorganosiloxane copolymer may have, for example, a viscosity average molecular weight of 18,000 to 30,000 g/mol or 25,000 to 30,000 g/mol. Within this range, superior rigidity, chemical resistance, impact resistance, and appearance characteristics are provided and a slim, large-area molded article may be provided.

In the present disclosure, the viscosity average molecular weight may be obtained by measuring the intrinsic viscosity [η] of a filtrate, which has been obtained by dissolving a polymer pellet in methylene chloride, at 20° C. by means of an Ubbelohde viscometer and then calculating the measured value according to Schnell's equation:

$$[\eta]=1.23\times10^{-5}\times Mv^{0.83}$$

a) The polycarbonate-polyorganosiloxane copolymer may have a weight average molecular weight, for example, 10,000 to 100,000 g/mol, 15,000 to 60,000 g/mol, 20,000 to 50,000 g/mol, 25,000 to 35,000 g/mol, or 30,000 to 33,000 g/mol. Within this range, superior rigidity, chemical resistance, impact resistance, and appearance characteristics are provided and a slim, large-area molded article may be provided.

In the present disclosure, the weight average molecular weight may be measured by calibrating with a PC standard using Agilent 1200 series.

a) The polycarbonate-polyorganosiloxane copolymer may be a general polycarbonate-polyorganosiloxane copolymer without any specific limitations. For example, a) the polycarbonate-polyorganosiloxane copolymer may be a polymer prepared by condensation-polymerizing a polycarbonate resin with polyorganosiloxane or a polymer prepared by interfacially polymerizing an aromatic diol compound, a carbonate precursor, and polyorganosiloxane.

In addition, a) the polycarbonate-polyorganosiloxane copolymer may be, for example, a polymer prepared by introducing a polysiloxane structure to a main chain of a polycarbonate. Here, the main chain of the polycarbonate may be formed by, for example, reacting an aromatic diol compound with a carbonate precursor.

The aromatic diol compound may be one or more selected from the group consisting of, for example, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dicholorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and a,ω-bis[3-(o-hydroxyphenyl)propyl]polydimethylsiloxane.

The carbonate precursor may be one or more selected from the group consisting of, for example, dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, bis(diphenyl) carbonate, carbonyl chloride(phosgene), triphosgene, diphosgene, carbonyl bromide, and bishaloformate.

The polyorganosiloxane is not specifically limited and may be may be one or more selected from the group consisting of, for example, polydimethylsiloxane, polydiethyl siloxane, polymethylphenylsiloxane, and the like.

In another embodiment, the polyorganosiloxane may be one or more selected from the group consisting of compounds represented by Formulas 1 and 2 below:

[Formula 1]

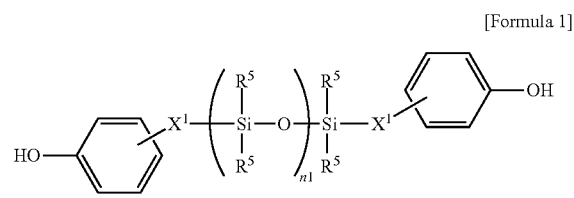

In Formula 1, $X^1$ is each independently $C_{1-10}$ alkylene, $R^5$ is each independently hydrogen; unsubstituted $C_{1-5}$ alkyl, oxiranyl, oxiranyl-substitued $C_{1-10}$ alkoxy, or $C_{6-20}$ aryl-substituted $C_{1-5}$ alkyl; halogen; $C_{1-10}$ alkoxy; allyl; $C_{1-10}$ haloalkyl; or $C_{6-20}$ aryl, and n1 is an integer of 10 to 200.

[Formula 2]

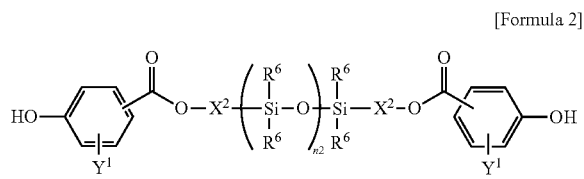

In Formula 2, $X^2$ is each independently $C_{1-10}$ alkylene, $Y^1$ is each independently hydrogen, $C_{1-6}$ alkyl, a halogen, hydroxy, $C_{1-6}$ alkoxy, or $C_{6-20}$ aryl, $R^6$ is each independently hydrogen; unsubstituted $C_{1-5}$ alkyl, oxiranyl, oxiranyl-substituted $C_{1-10}$ alkoxy, or $C_{6-20}$ aryl-substituted $C_{1-15}$ alkyl; halogen; $C_{1-10}$ alkoxy; allyl; $C_{1-10}$ haloalkyl; or $C_{6-20}$ aryl, and n2 is an integer of 10 to 200.

The compounds represented by Formulas 1 and 2 may be prepared according to, for example, Reaction Formulas 1 and 2 below, respectively:

[Reaction Formula 1]

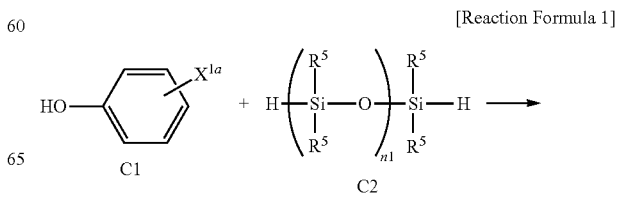

-continued

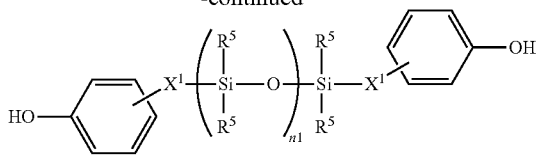

In Reaction Formula 1, $X^{1a}$ is $C_{2-10}$ alkenyl, and $X^1$, $R^5$, and n1 respectively are the same as those defined in Formula 1.

[Reaction Formula 2]

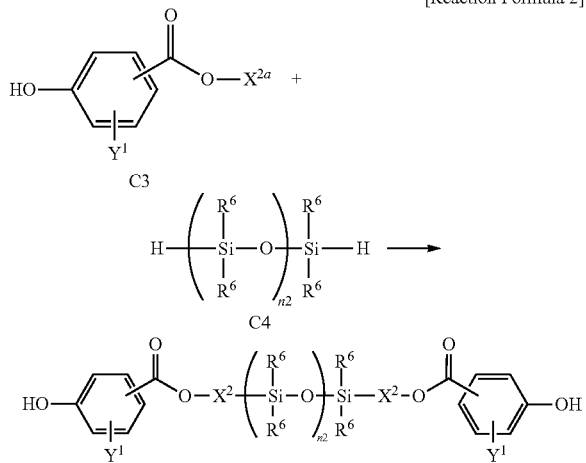

In Reaction Formula 2, $X^{2a}$ is $C_{2-10}$ alkenyl, and $X^2$, $Y^1$, $R^6$, and n2 respectively are the same as those defined in Formula 2.

The reactions of Reaction Formulas 1 and 2 may be performed, for example, in the presence of a metal catalyst.

The metal catalyst is preferably a Pt catalyst. The Pt catalyst may be one or more selected from the group consisting of an Ashby catalyst, a Karstedt catalyst, a Lamoreaux catalyst, a Speier catalyst, $PtCl_2(COD)$, $PtCl_2$(benzonitrile)$_2$, and $H_2PtBr_6$.

The metal catalyst may be used in an amount of, for example, 0.001 parts by weight or more, 0.005 parts by weight or more, or 0.01 parts by weight or more and 1 parts by weight or less, 0.1 parts by weight or less, or 0.05 parts by weight or less, based on 100 parts by weight of the compound by represented C2 or C4.

The reaction temperature is preferably 80 to 100° C. In addition, the reaction time is preferably 1 to 5 hours.

In addition, the compound represented by Formula C2 or C4 in Reaction Formulas 1 and 2 may be prepared by, for example, reacting organodisiloxane with organocyclosiloxane in the presence of an acid catalyst. In addition, n1 and n2 may be controlled by controlling the contents of the reacted materials. Here, a reaction temperature is preferably 50 to 70° C. and a reaction time is preferably 1 to 6 hours.

The organodisiloxane may be one or more selected from the group consisting of, for example, tetramethyldisiloxane, tetraphenyldisiloxane, hexamethyldisiloxane, and hexaphenyldisiloxane. In addition, the organocyclosiloxane may be, for example, organocyclotetrasiloxane. For example, the organocyclotetrasiloxane may be octamethylcyclotetrasiloxane, octaphenylcyclotetrasiloxane, etc.

The organodisiloxane may be used in an amount of, for example, 0.1 parts by weight or more or 2 parts by weight or more and 10 parts by weight or less or 8 parts by weight or less, based on 100 parts by weight of the organocyclosiloxane.

The acid catalyst may be one or more selected from the group consisting of, for example, $H_2SO_4$, $HClO_4$, $AlCl_3$, $SbCl_5$, $SnCl_4$, and acid clay. In addition, the acid catalyst may be used in an amount of 0.1 parts by weight or more, 0.5 parts by weight or more, or 1 parts by weight or more and 10 parts by weight or less, 5 parts by weight or less, or 3 parts by weight or less, based on 100 parts by weight of the organocyclosiloxane.

The polyorganosiloxane may be included in an amount of, for example, 5 to 20% by weight or 6 to 10% by weight, based on a) the polycarbonate-polyorganosiloxane copolymer. Within this range, superior chemical resistance and impact resistance are provided.

Upon the interfacial polymerization, the polyorganosiloxane may be used in an amount of, for example, 0.1% by weight or more, 0.5% by weight or more, 1% by weight or more, or 1.5% by weight or more and 20% by weight or less, 10% by weight or less, 7% by weight or less, 5% by weight or less, 4% by weight or less, 3% by weight or less, or 2% by weight or less, based on 100% by weight of a total of the aromatic diol compound, carbonate precursor, and polyorganosiloxane.

In addition, the aromatic diol compound may be used in an amount of, for example, 40% by weight or more, 50% by weight or more, or 55% by weight or more and 80% by weight or less, 70% by weight or less, or 65% by weight or less, based on 100% by weight of a total of the aromatic diol compound, carbonate precursor, and polyorganosiloxane.

In addition, the carbonate precursor may be used in an amount of, for example, 10% by weight or more, 20% by weight or more, or 30% by weight and 60% by weight or less, 50% by weight or less, or 40% by weight or less, based on 100% by weight of a total of the aromatic diol compound, carbonate precursor, and polyorganosiloxane.

The interfacially polymerizing is preferably carried out, for example, in the presence of an acid binder and an organic solvent.

In addition, the interfacial polymerization may include, for example, a step of adding a coupling agent after pre-polymerization and then re-polymerizing. In this case, copolycarbonate having a high molecular weight may be obtained.

Materials used in the interfacially polymerization are not specifically limited so long as they may be used in polymerization of polycarbonate. Use amounts of the materials may be controlled as needed.

As the acid binder, for example, an alkali metal hydroxide, such as sodium hydroxide or potassium hydroxide, or an amine compound, such as pyridine, may be used.

The organic solvent is not specifically limited so long as it may be used in general polycarbonate polymerization. For example, a reaction promoter, such as a halogenated hydrocarbon, such as methylene chloride or chlorobenzene, may be used. In addition, in the interfacial polymerization, a reaction promoter, such as a tertiary amine compound, e.g., triethylamine, tetra-n-butylammonium bromide, or tetra-n-butylphosphonium bromide; a quaternary ammonium compound; or a quaternary phosphonium compound may be additionally used as the organic solvent.

A reaction temperature of the interfacial polymerization is preferably 0 to 40° C. and a reaction time thereof is preferably 10 minutes to 5 hours.

In addition, during the interfacially polymerization, pH is preferably maintained at 9 or more or 11 or more.

In addition, during the interfacial polymerization, a molecular weight regulator may be further included.

The molecular weight regulator may be added before or after initiation of the polymerization or during the polymerization.

For example, mono-alkylphenol may be used as the molecular weight regulator. The mono-alkylphenol may be one or more selected from the group consisting of, for example, p-tert-butylphenol, p-cumylphenol, decylphenol, dodecylphenol, tetradecylphenol, hexadecylphenol, octadecylphenol, eicosylphenol, docosylphenol, and triacontylphenol. Preferably, the mono-alkylphenol is p-tert-butylphenol and, in this case, molecular weight control effect is large.

The molecular weight regulator is included in an amount, for example, 0.01 parts by weight or more, 0.1 parts by weight or more, or 1 parts by weight or more and 10 parts by weight or less, 6 parts by weight or less, or 5 parts by weight or less, based on 100 parts by weight of the aromatic diol compound. Within this range, a desired molecular weight may be obtained.

In another embodiment, the amount of b) the bisphenol-derived polycarbonate resin may be 35 to 65% by weight or 37 to 63% by weight. Within this range, superior chemical resistance, moldability, and property balance are provided.

b) The bisphenol-derived polycarbonate resin may have a melt index (300° C., 1.2 kg) of, for example, 3 to 20 g/10 minutes, 5 to 15 g/10 minutes, or 8 to 13 g/10 minutes. Within this range, superior chemical resistance, moldability, and property balance are provided.

In the present disclosure, the melt index may be measured according to ASTM D1238.

b) The bisphenol-derived polycarbonate resin is, for example, a polymerized polycarbonate resin (not including polyorganosiloxane) including a bisphenol compound and a carbonate precursor.

The bisphenol compound may be one or more selected from the group consisting of, for example, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dicholrophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and alpha,omega-bis[3-(o-hydroxyphenyl)propyl]polydimethylsiloxane. Preferably, the bisphenol compound is bisphenol A.

The carbonate precursor may be one or more selected from the group consisting of, for example, dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, bis(diphenyl) carbonate, carbonyl chloride(phosgene), triphosgene, diphosgene, carbonyl bromide, and bishaloformate.

A method of polymerizing the bisphenol-derived polycarbonate resin is not specifically limited so long as it is a polymerization method generally used in the art으| polymerization. For example, the method may be interfacial polymerization.

In another embodiment, the amount of c) the glass fiber surface-treated with epoxysilane may be 5 to 10% by weight, 20 to 30% by weight, or 10 to 20% by weight. Within this range, superior chemical resistance, appearance characteristics, and rigidity are provided.

c) the glass fiber may be have an aspect ratio ($\delta$) of, for example, 50 to 200, 80 to 150, 90 to 130, or 100 to 120, which are calculated according to Equation 1 below:

$$\delta = L/D \qquad \text{[Equation 1]}$$

wherein L represents the length of glass fiber and D represents the width of glass fiber. Within this range, superior chemical resistance, appearance characteristics, and rigidity are provided.

In the present disclosure, the length of the glass fiber and the width thereof may be measured by means of a scanning electron microscope (SEM) or a microscope.

The width of the glass fiber corresponds to, when a cross section made by perpendicularly cutting the glass fiber in a longitudinal direction thereof is a rectangle, the longest side of the cross section and, when the cut cross section is an oval, the longest diameter of the cross section.

The width of c) the glass fiber may be, for example, 10 to 50 μm, 10 to 40 μm, 20 to 35 μm, or 25 to 30 μm. Within this range, superior chemical resistance, appearance characteristics, and rigidity are provided.

The length of c) the glass fiber may be, for example, 2 to 10 mm, 2 to 5 mm, 3 to 4 mm, or 3 mm. Within this range, superior chemical resistance, appearance characteristics, and rigidity are provided.

The surface treatment is not specifically limited so long as it is a general method, such as impregnation, of treating a surface of glass fiber.

The epoxysilane is not specifically limited so long as it may be used in a general method of treating a surface of glass fiber. In this case, epoxy groups chemically bind with functional groups of other ingredients, thereby further increasing rigidity or chemical resistance of the resin composition and the molded article.

In another embodiment, the amount of d) the core-shell impact modifier may be 1 to 3% by weight or 1.5 to 2.5% by weight. Within this range, superior chemical resistance, thermal stability, moldability, and impact strength are provided.

d) The core-shell impact modifier may be, for example, a silicone-acrylic impact modifier. Within this range, superior chemical resistance, thermal stability, moldability, and impact strength are provided.

The silicone-acrylic impact modifier may be, for example, a copolymer having a core-shell structure prepared by graft-copolymerizing a silicone-based rubber with an acrylic monomer and methacrylic monomer. Within this range, superior chemical resistance, moldability, and impact strength are provided.

The silicone-acrylic impact modifier may include, for example, 30 to 80% by weight of the acrylic monomer, 10 to 50% by weight of the methacrylic monomer, and 5 to 20% by weight of the silicone-based monomer. Within this range, superior chemical resistance, moldability, and impact strength are provided.

The silicone-based monomer is not specifically limited so long as it is a general silicone-based rubber ingredient monomer. For example, the silicone-based monomer may be one or more selected from the group consisting of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like.

The acrylic monomer may be, for example, alkyl acrylate, in which a carbon number of an alkyl group is 1 to 10, or aryl acrylate, in which a carbon number of an aryl group is 6 to 10. In a specific embodiment, the acrylic monomer may be one or more selected from the group consisting of methyl acrylate, butyl acrylate, benzyl acrylate, and the like.

The methacrylic monomer may be, for example, alkyl methacrylate, in which a carbon number of an alkyl group is 1 to 10, or aryl methacrylate, in which a carbon number of an aryl group is 6 to 10. In a specific embodiment, the methacrylic monomer may be one or more selected from the group consisting of methyl methacrylate, butyl methacrylate, benzyl methacrylate, and the like.

In another embodiment, the amount of e) the epoxysilane additive may be 0.1 to 2% by weight, 0.1 to 1% by weight, or 0.2 to 1% by weight. Within this range, superior chemical resistance and rigidity are provided.

In e) the epoxysilane additive, the number of epoxy groups bonded to a silane may be, for example, 1 to 15, 5 to 12, or 8 to 10. Within this range, superior chemical resistance and rigidity are provided.

e) The epoxysilane additive is, for example, a compound having a polyvalent epoxy group and a silane group, and may be directly synthesized or obtained from a commercially available ingredient. Preferably, the epoxysilane additive is an epoxysilane compound, one end of which has a silane group and another end of which has epoxy. In this case, superior chemical resistance and rigidity are provided.

The weight average molecular weight of e) the epoxysilane additive may be, for example, 5,000 to 10,000 g/mol, or 6,000 to 7,500 g/mol. Within this range, superior chemical resistance and rigidity are provided.

The epoxy equivalent weight of e) the epoxysilane additive may be, for example, 100 to 5,000 g/mol, or 200 to 4,000 g/mol. Within this range, superior chemical resistance and rigidity are provided.

The glass transition temperature of e) the epoxysilane additive may be 50 to 70° C., or 55 to 65° C. Within this range, superior chemical resistance and rigidity are provided.

In another embodiment, the polycarbonate resin composition of the present disclosure includes a) 15 to 93% by weight or 15 to 50% by weight of a polycarbonate-polyorganosiloxane copolymer; b) 0 to 70% by weight or 30 to 70% by weight of a bisphenol-derived polycarbonate resin; c) 5 to 30% by weight of glass fiber surface-treated with epoxysilane; d) 1 to 5% by weight of a core-shell impact modifier; and e) 0.05 to 3% by weight of an epoxysilane additive or 0.1 to 1% by weight. Here, a refractive index difference between c) the glass fiber surface-treated with epoxysilane and a) the polycarbonate-polyorganosiloxane copolymer; or a mixed resin including a) the polycarbonate-polyorganosiloxane copolymer and b) the bisphenol-derived polycarbonate resin is 0.002 or less, e) the epoxysilane additive contains 1 to 15 epoxy groups and has a refractive index of 1.45 to 1.65, and gloss particles or a flame retardant aid or a combination thereof may be further included as other additives. Within this range, aesthetic appearance is provided to a product during molding while providing superior rigidity, flame resistance, appearance characteristics, metallic color, chemical resistance, and impact resistance, thereby being suitable for satisfying demand for larger area and slimmer electronic products, etc.

In another embodiment, a refractive index difference between c) the glass fiber surface-treated with epoxysilane and a) the polycarbonate-polyorganosiloxane copolymer; or a mixed resin including a) the polycarbonate-polyorganosiloxane copolymer and b) the bisphenol-derived polycarbonate resin may be 0.001 or less, or 0.0001 or less. Within this range, aesthetic appearance may be provided to a molded article.

In another embodiment, the refractive index of e) the epoxysilane additive may be 1.48 to 1.60.

the gloss particles are one or more selected from the group consisting of, for example, mica; metal particles; metal sulfide particles; particles, surfaces of which are coated with a metal or a metal oxide; and glass flakes, surfaces of which are coated with a metal or a metal oxide. In this case, superior metallic color, appearance characteristics, and flame resistance are provided.

The metal particles may be, for example, a powder from a metal such as aluminum, gold, silver, copper, nickel, titanium, or stainless steel. The metal sulfide particles may be, for example, a powder from a metal sulfide such as nickel sulfide, cobalt sulfide, or manganese sulfide. Particles surface-treated with a metal or a metal oxide may be, for example, mica-based metal oxide coating particles such as mica titanium particles coated with titanium oxide or mica particles coated with bismuth trichloride. The glass flakes, surfaces of which are coated with a metal or a metal oxide, may be surface-coated, for example, with one or more selected from the group consisting of gold, silver, platinum, palladium, nickel, copper, chromium, tin, titanium, and silicon and oxides thereof.

The volume average particle diameter of the gloss particles may be, for example, 10 to 300 μm.

In the present disclosure, the volume average particle diameter may be obtained by measuring D50(v) by means of Microtrac 252 (Microtrac Inc.) after dispersing particles to be measured in distilled water and a surfactant.

The amount of the gloss particles may be, for example, 0.05 to 7.0 parts by weight or 0.5 to 5 parts by weight, based on 100 parts by weight of a total of a) the polycarbonate-polyorganosiloxane copolymer, b) the bisphenol-derived polycarbonate resin, and c) glass fiber surface-treated with epoxysilane. Within this range, superior metallic color, appearance characteristics, and flame resistance are provided.

The flame retardant aid is, for example, a silicone compound containing a reactive functional group, or a polytetrafluoroethylene resin. Preferably, the flame retardant aid is a reactive silicone compound having a refractive index of 1.49 to 1.51 and, as functional groups, vinyl and methoxy groups.

In the present disclosure, the refractive index may be measured at 25° C. by means of an Abbe refractometer according to ASTM D1298 after manufacturing a material to be measured in a thin film shape having a thickness of 0.2 mm.

The tensile strength of the polycarbonate resin composition may be, for example, 600 to 1,250 kg/cm$^2$, or 670 to 1,200 kg/cm$^2$. Within this range, superior property balance is provided.

The flexural strength of the polycarbonate resin composition may be, for example, 1,000 to 1,800 kg/cm$^2$, or 1,100 to 1,600 kg/cm$^2$. Within this range, superior property balance is provided.

The flexural modulus of the polycarbonate resin composition may be, for example, 30,000 to 80,000 kg/cm$^2$, or 30,000 to 75,000 kg/cm$^2$. Within this range, superior property balance is provided.

The impact strength (⅛") of the polycarbonate resin composition may be, for example, 15 to 25 kg·cm/cm, or to 23 kg·cm/cm. Within this range, superior property balance is provided.

One or more selected from the group consisting of a heat stabilizer, a lubricant, a processing agent, a plasticizer, a coupling agent, a light stabilizer, a release agent, a dispersant, an anti-dripping agent, a weather stabilizer, an antioxidant, a compatibilizer, a pigment, a dye, an antistatic agent, an antiwear agent, a filler, a flame retardant, and an antimicrobial agent may be further included in an amount of 0.1 to 20 parts by weight, 0.1 to 10 parts by weight, or 1 to 5 parts by weight, based on 100 parts by weight of the polycarbonate resin composition of the present disclosure, as needed in a range in which the properties of the polycarbonate resin composition are not deteriorated.

A method of preparing the polycarbonate resin composition of the present disclosure may include a step of, for example, dry blending a) 15 to 93% by weight of a polycarbonate-polyorganosiloxane copolymer, b) 0 to 70% by weight of a bisphenol-derived polycarbonate resin, c) 5 to 30% by weight of glass fiber surface-treated with epoxysilane, d) 1 to 5% by weight of a core-shell impact modifier, and e) 0.05 to 3% by weight of an epoxysilane additive and then melt-kneading, followed by extruding.

The melt-kneading may be carried out, for example, at 270 to 320° C. Preferably, the melt-kneading is carried out at 280 to 290° C. Within this range, physical and chemical affinity among constituents is high, thereby providing superior property balance.

The method of preparing the polycarbonate resin composition may include, for example, a step of injection-molding an extruded polycarbonate resin composition by means of an injection machine.

A molded article of the present disclosure is manufactured from the polycarbonate resin composition of the present disclosure.

The molded article may be, for example, a cellular phone case.

Now, the present invention will be described in more detail with reference to the following preferred examples. These examples are provided for illustrative purposes only and should not be construed as limiting the scope and spirit of the present invention. Those skilled in the art will appreciate that various modifications, additions and substitutions are possible, without departing from the scope and spirit of the invention. Therefore, it is obvious that the modifications, additions and substitutions are included in the scope of the present invention.

EXAMPLES

Hereinafter, each of constituents (A to E) used in Examples 1 to 6 and Comparative Examples 1 to 7 below is described in detail.

<(A) Polycarbonate-polyorganosiloxane Copolymer (Si-PC)>

SPC8000-05, manufactured by LG Chem, or TRIREX ST6-3022PJ(1) was used as a polycarbonate-polyorganosiloxane copolymer that was a polymer prepared by condensation-polymerizing a polycarbonate resin with polyorganosiloxane. Here, SPC8000-05 or TRIREX ST6-3022PJ (1) had a weight average molecular weight of about 30,000 g/mol and a refractive index of 1.57, measured by a GPC method using a PC standard.

<(B) Bisphenol A Polycarbonate Resin (PC)>

Bisphenol A polycarbonate resin ((B)-1) having a refractive index of 1.586, a weight average molecular weight of 30,000~31,000 g/mol, a melt index (ASTM D1238, 300° C., load of 1.2 kg) of 10 g/10 minutes, and a refractive index of 1.586, and bisphenol A polycarbonate resin ((B)-2) having a weight average molecular weight of 24,000-25,000 g/mol, a melt index (ASTM D1238, 300° C., 1.2kg의 하중) of 22 g/10 minutes were respectively used.

The bisphenol A polycarbonate resin ((B)-1) was prepared, for example, by the following method.

1784 g of water, 385 g of NaOH, and 232 g of bisphenol A (BPA) were added to a polymerization reactor, followed by mixing and dissolving under a N2 atmosphere. 128 g of triphosgene (TPG) which had been dissolved in MC was added to the resultant mixture over one hour while maintaining the pH at 11 or higher, and reaction occurred. 10 minutes later, 46 g of triethylamine (TEA) was added thereto such that coupling reaction occurred. After a total reaction time of 1 hour and 20 minutes, pH was lowered to 4 to remove TEA and washing with distilled water was performed three times to adjust the pH of a generated polymer to a neutral pH, i.e., 6 to 7. An obtained polymer was re-precipitated in a mixed solution of methanol and hexane. A resultant product was dried at 120° C., thereby obtaining a final polycarbonate resin (Mw=31000; MI=10 g/10 minutes even at 300° C. and under a load of 1.2 kg).

The bisphenol A polycarbonate resin ((B)-2) was prepared, for example, by the following method.

1784 g of water, 385 g of NaOH, and 232 g of bisphenol A (BPA) were added to a polymerization reactor, followed by mixing and dissolving under a N2 atmosphere. 128 g of triphosgene (TPG) which had been dissolved in MC was added to the resultant mixture over one hour while maintaining the pH at 11 or higher, and reaction occurred. 10 minutes later, 46 g of triethylamine (TEA) was added thereto such that coupling reaction occurred. After a total reaction time of 1 hour and 20 minutes, pH was lowered to 4 to remove TEA and washing with distilled water was performed three times to adjust the pH of a generated polymer to a neutral pH, i.e., 6 to 7. An obtained polymer was re-precipitated in a mixed solution of methanol and hexane. A resultant product was dried at 120° C., thereby obtaining a final polycarbonate resin (Mw=26000; MI=22 g/10 minutes even at 300° C. and under a load of 1.2 kg).

<(C)-1 Glass Fiber>

Glass fiber surface-treated with an epoxysilane-based compound, which was manufacture by Nittobo and had a width (D) of 28 μm, a thickness of 7 μm, a length (L) of 3 mm, an aspect ratio (δ) of 107, and a refractive index of 1.546 to 1.562, was used.

<(C)-2 Glass Fiber>

Glass fiber surface-treated with an epoxysilane-based compound, which was manufactured by OWENS CORNING and had a width (D) of 10 to 13 μm, a length (L) of 4 mm, an aspect ratio (δ) of 308 to 400, and a refractive index of 1.546 to 1.562, was used.

<(C)-3 Glass Fiber>

Glass fiber surface-treated with olefin silane, which was manufactured by OWENS CORNING and had a diameter (D) of 10 to 13 μm, a length (L) of 4 mm, an aspect ratio (δ) of 308 to 400, and a refractive index of 1.546 to 1.562, was used.

<(D)-1 Impact Modifier>

Metablen S-2100, which was manufactured by MRC, Japan and in which silicone-acrylate rubber was used, was used.

<(D)-2 Impact Modifier>

EM505, which included an MMA-BD based rubber and thus had a core-shell structure, manufactured by LG Chem was used.

<(E)-1 Epoxysilane Additive>

Joncryl ADR 4370-F, which had a weight average molecular weight of 6500 to 7000 g/mol, an epoxy equivalent weight of 270 to 3000 g/mol, nine epoxy groups, and a Tg of 61° C., manufactured by BASF was used.

<(E)-2 Epoxysilane Additive>

Silquest A-187 (refractive index: 1.427) manufactured by Momentive and represented by Formula A below was used:

Gamma-Glycidoxypropyltrimethoxysilane

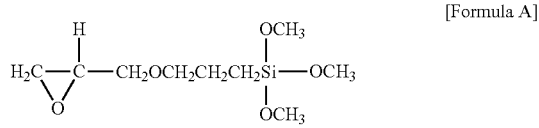

[Formula A]

Examples 1 to 7 and Comparative Examples 1 to 8

Each of the constituents (A to E) was melt-kneaded at 290° C. by means of a twin-screw extruder according to weight ratios summarized in Table 1 below and then extruded, thereby preparing polycarbonate resin composition pellets. The prepared pellets were molded into specimens for measuring properties by means of an injection molding machine.

Test Example

The characteristics of the reinforced polycarbonate resin specimen prepared according to each of Example 1 to 7 and Comparative Examples 1 to 8 were measured according to the following methods. Results are summarized in Tables 1 and 2 below.

(1) Chemical resistance: The composition was pelletized by means of a Φ40 mm twin-screw extruder equipped with a vent, and then injection molded at a cylinder temperature of 300° C. and a mold temperature of 80° C. by means of an N-20C injection molding machine manufactured by JSW Co., Ltd., thereby preparing a specimen. Eight points of The specimen, which has a smartphone size, were designated, and were respectively coated by being sprayed with a liquid-type suncream (product name: Nivea Aqua Protect Sun Spray) for 0.5 seconds. After coating, crack occurrence time was observed during 24 hours. In the following Table 2, the results of the chemical resistance evaluation are summarized as the time at which cracks started to occur (the time at which cracks started to occur at any one of the eight points), and the case in which crack occurrence was not observed for 24 hours is marked as "No Crack (NC)".

(2) Tensile strength: Measured at 23° C. according to ASTM D638.

(3) Flexural strength and flexural modulus: Measured at 23° C. according to ASTM D790.

(4) Impact strength at room temperature: Measured at 23° C. according to ASTM D256 (⅛ inch, Notched Izod).

TABLE 1

| Classification | | Examples | | | | | | |
|---|---|---|---|---|---|---|---|---|
| | | 1 | 2 | 3 | 4 | 5 | 6 | 7 |
| A | | 30 | 30 | 30 | 92.8 | 30 | 30 | 30 |
| B | 1 | 62.8 | 62 | 37.8 | | 62.8 | 62.8 | 62.8 |
| | 2 | | | | | | | |
| C | 1 | 5 | 5 | 30 | 5 | 5 | | 5 |
| | 2 | | | | | | 5 | |
| | 3 | | | | | | | |
| D | 1 | 2 | 2 | 2 | 2 | 2 | 2 | |
| | 2 | | | | | | | 2 |
| E | 1 | 0.2 | 1 | 0.2 | 0.2 | | 0.2 | 0.2 |
| | 2 | | | | | 0.2 | | |
| Tensile strength (kg/cm²) | | 680 | 700 | 1,200 | 680 | 670 | 680 | 670 |
| Flexural strength (kg/cm²) | | 1,100 | 1,200 | 1,600 | 1,100 | 1,100 | 1,100 | 1,100 |
| Flexural modulus (Kg/cm2) | | 30,000 | 32,000 | 75,000 | 30,000 | 30,000 | 30,000 | 30,000 |
| Impact strength (kg · cm/cm) | | 20 | 20 | 15 | 20 | 23 | 20 | 20 |
| Chemical resistance (hr) | | NC* | NC | NC | NC | NC | NC | NC |

TABLE 2

| Classification | | Comparative Examples | | | | | | | |
|---|---|---|---|---|---|---|---|---|---|
| | | 1 | 2 | 3 | 4 | 5 | 6 | 7 | 8 |
| A | | 30 | 30 | | 30 | 30 | 30 | 30 | 30 |
| B | 1 | 67.8 | 63 | 92.8 | 32.8 | | 62.8 | 37.8 | 64.8 |
| | 2 | | | | 30 | 62.8 | | | |
| C | 1 | | 5 | 5 | 5 | | | | 5 |
| | 2 | | | | | | | | |
| | 3 | | | | | 5 | 5 | 30 | |

TABLE 2-continued

| Classification | | Comparative Examples | | | | | | | |
|---|---|---|---|---|---|---|---|---|---|
| | | 1 | 2 | 3 | 4 | 5 | 6 | 7 | 8 |
| D | 1 | 2 | 2 | 2 | 2 | 2 | 2 | 2 | |
| | 2 | | | | | | | | |
| E | 1 | 0.2 | | 0.2 | 0.2 | 0.2 | 0.2 | 0.2 | 0.2 |
| | 2 | | | | | | | | |
| Tensile strength (kg/cm$^2$) | | 560 | 680 | 700 | 680 | 680 | 550 | 530 | 700 |
| Flexural strength (kg/cm$^2$) | | 900 | 1,100 | 1,100 | 1,100 | 1,100 | 900 | 910 | 1,100 |
| Flexural modulus (Kg/cm$^2$) | | 23,000 | 30,000 | 30,000 | 30,000 | 30,000 | 27,000 | 40,000 | 30,000 |
| Impact strength (kg · cm/cm) | | 70 | 20 | 18 | 20 | 20 | 23 | 18 | 13 |
| Chemical resistance (hr) | | 0.5 | 5 | 5 | 1 | 0.5 | 1 | 1.5 | 7 |

As shown in Table 1, it can be confirmed that all mechanical properties of the polycarbonate resin compositions (Examples 1 to 7) of the present disclosure are improved. Particularly, it can be confirmed that the polycarbonate resin compositions (Examples 1 to 7) of the present disclosure exhibit excellent surface characteristics and chemical resistance.

However, it can be confirmed that, outside the range of the present disclosure (Comparative Examples 1 to 8), property balance is deteriorated and poor surface characteristics and chemical resistance are exhibited.

Additional Example 1

A polycarbonate resin composition pellet was prepared in the same manner as in Example 1, except that 0.3 parts by weight of a reactive silicone compound (KR-219, Shin-Etsu Chemical Co., Ltd.), as a flame retardant aid, having a refractive index of 1.51, and vinyl and methoxy groups as functional groups was further included and 2 parts by weight of glass flakes (MC1030RS, Nippon Sheet Glass Co., Ltd.) coated with titanium oxide, as gloss particles, were further included, based on 100 parts by weight of a total of (A) the copolymer and (B) resin of Example 1. The prepared pellet was molded to a specimen for measuring properties.

Additional Test Example

Flame resistance and appearance characteristics of the polycarbonate resin composition prepared by Additional Example 1 were measured according to the following methods. Results are summarized in Table 3 below.

(5) Flame resistance: The prepared resin composition pellet was injection-molded at a mold temperature of 130° C. and a resin composition temperature of 300° C. by means of 140 T Injection molding machine (HSP140EH2, Sodick), thereby preparing a 127×12.7×1.5 mm specimen. The flame resistance of the prepared specimen was measured according to UL94.

(6) Appearance characteristics: The appearance of a specimen was observed with the naked eye to investigate a metallic color.

TABLE 3

| Composition | Additional Example 1 |
|---|---|
| A | 30 |
| B1 | 62.8 |
| C1 | 5 |
| D1 | 2 |
| E1 | 0.2 |
| Flame retardant aid | 0.3 |
| Gloss particles | 2 |
| Tensile strength (kg/cm$^2$) | 680 |
| Flexural strength (kg/cm$^2$) | 1,000 |
| Flexural modulus (Kg/cm2) | 29,000 |
| Impact strength (kg · cm/cm) | 20 |
| Chemical resistance (hr) | NC* |
| Flame resistance (UL-94) | V-O |
| Appearance | Metallic appearance |

As shown in Table 3, it can be confirmed that the polycarbonate resin composition (Additional Example 1) including a flame retardant aid and gloss particles according to the present disclosure exhibits superior chemical resistance, flame resistance, and appearance characteristics and has metallic color.

Reference Example 1

A specimen was prepared in the same manner as in Example 1, except that B1 was used in an amount of 26.8 parts by weight and C1 was used in an amount of 41 parts by weight.

Reference Example 2

A specimen was prepared in the same manner as in Example 1, except that B1 was not used and C1 was used in an amount of 55 parts by weight.

In the cases of the specimens prepared according to Reference Examples 1 and 2, glass fibers (G/F) were observed to protrude from surfaces the specimens, with the naked eye, and thus, it was confirmed that appearance characteristics thereof were deteriorated. Accordingly, many painting and coating processes are anticipated to be required.

The invention claimed is:
1. A polycarbonate resin composition, comprising:
a) 15 to 93% by weight of a polycarbonate-polyorganosiloxane copolymer;
b) 0 to 70% by weight of a bisphenol-derived polycarbonate resin;
c) 5 to 30% by weight of glass fiber surface-treated with epoxysilane;
d) 1 to 5% by weight of a core-shell impact modifier; and
e) 0.05 to 3% by weight of an epoxysilane additive which contains 1 to 15 epoxy groups and has a refractive index of 1.45 to 1.65,
wherein the polyorganosiloxane of the polycarbonate-polyorganosiloxane copolymer is one or more selected from the group consisting of compounds represented by Formulas 1 and 2:

[Formula 1]

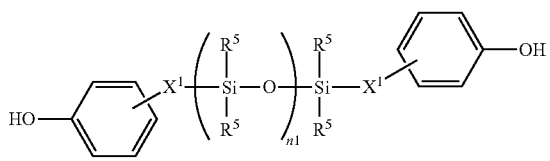

wherein $X^1$ is each independently $C_{1-10}$ alkylene; $R^5$ is each independently hydrogen, $C_{1-5}$ alkyl unsubstituted or substituted with oxiranyl, oxiranyl-substitued $C_{1-10}$ alkoxy, or $C_{6-20}$ aryl, halogen, $C_{1-10}$ alkoxy, allyl, $C_{1-10}$ haloalkyl, or $C_{6-20}$ aryl; and n1 is an integer of 10 to 200,

[Formula 2]

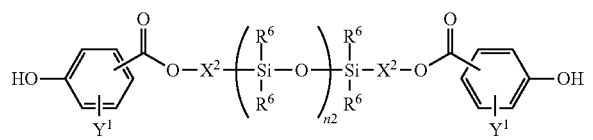

wherein, $X^2$ is each independently $C_{1-10}$ alkylene; $Y^1$ is each independently hydrogen, $C_{1-6}$ alkyl, a halogen, hydroxy, $C_{1-6}$ alkoxy, or $C_{6-20}$ aryl; $R^6$ is each independently hydrogen, $C_{1-5}$ alkyl unsubstituted or substituted with oxiranyl, oxiranyl-substituted $C_{1-10}$ alkoxy, or $C_{6-20}$ aryl-substituted $C_{1-15}$ alkyl, halogen, $C_{1-10}$ alkoxy, allyl, $C_{1-10}$ haloalkyl, or $C_{6-20}$ aryl; and n2 is an integer of 10 to 200.

2. The polycarbonate resin composition according to claim 1, wherein the polycarbonate resin composition comprises a) 15 to 50% by weight of the polycarbonate-polyorganosiloxane copolymer; b) 30 to 70% by weight of the bisphenol-derived polycarbonate resin; c) 5 to 30% by weight of the glass fiber surface-treated with epoxysilane; d) 1 to 5% by weight of the core-shell impact modifier; and e) 0.1 to 1% by weight of the epoxysilane additive.

3. The polycarbonate resin composition according to claim 1, wherein a) the polycarbonate-polyorganosiloxane copolymer has a viscosity average molecular weight of 18,000 to 30,000 g/mol.

4. The polycarbonate resin composition according to claim 1, wherein b) the bisphenol-derived polycarbonate resin has a melt index (300° C., 1.2 kg) of 3 to 20 g/10 minutes.

5. The polycarbonate resin composition according to claim 1, wherein c) the glass fiber has an aspect ratio (δ) of 50 to 200 calculated by Equation 1 below:

$$\delta = L/D \quad \text{[Equation 1]}$$

wherein L represents a length of glass fiber and D represents a width of glass fiber.

6. The polycarbonate resin composition according to claim 1, wherein d) the core-shell impact modifier is a silicone-acrylic impact modifier.

7. The polycarbonate resin composition according to claim 1, wherein a refractive index difference between c) the glass surface-treated with epoxysilane and a) the polycarbonate-polyorganosiloxane copolymer or a mixed resin comprising a) the polycarbonate-polyorganosiloxane copolymer and b) the bisphenol-derived polycarbonate resin is 0.002 or less, and gloss particles or a flame retardant aid or a combination thereof are further comprised as other additives.

8. The polycarbonate resin composition according to claim 1, wherein the polycarbonate resin composition has a tensile strength of 600 to 1,250 kg/cm².

9. The polycarbonate resin composition according to claim 1, wherein the polycarbonate resin composition has a flexural strength of 1,000 to 1,800 kg/cm².

10. The polycarbonate resin composition according to claim 1, wherein the polycarbonate resin composition has a flexural modulus of 30,000 to 80,000 kg/cm².

11. The polycarbonate resin composition according to claim 1, wherein the polycarbonate resin composition has an impact strength (⅛") of 15 to 25 kg·cm/cm.

12. A molded article manufactured from the polycarbonate resin composition according to claim 1.

13. The molded article according to claim 12, wherein the molded article is a cellular phone case.

* * * * *